United States Patent [19]

Sakagami et al.

[11] Patent Number: 5,236,639

[45] Date of Patent: Aug. 17, 1993

[54] METHOD OF MANUFACTURE COMPOSITE MATERIAL OF CARBON FIBERS IN A CARBON MATRIX

[75] Inventors: Seigou Sakagami; Yoshuke Takemura; Satoshi Wakamasu; Takatoshi Takemoto, all of Hyogo, Japan

[73] Assignee: Sumitomo Electric Industries, Ltd., Osaka, Japan

[21] Appl. No.: 810,878

[22] Filed: Dec. 20, 1991

[30] Foreign Application Priority Data

Dec. 28, 1990 [JP] Japan .................................. 2-409477
Aug. 28, 1991 [JP] Japan .................................. 3-217331

[51] Int. Cl.⁵ ............................................. C04B 35/52
[52] U.S. Cl. .................................. 264/29.3; 264/29.5; 264/29.1; 264/349; 423/447.2
[58] Field of Search .................... 264/29.1, 29.2, 29.3, 264/29.5, 349; 423/447.1, 447.2

[56] References Cited

U.S. PATENT DOCUMENTS 3,718,720  2/1973  Lambdin, Jr. et al. ............ 264/29.1
3,917,884  11/1975  Jahn .

FOREIGN PATENT DOCUMENTS 0335736  10/1989  European Pat. Off. .
2615651  10/1976  Fed. Rep. of Germany .
2714364  10/1978  Fed. Rep. of Germany .
61-197467  9/1986  Japan .
63-5349  2/1988  Japan .
1492712  11/1977  United Kingdom .

OTHER PUBLICATIONS

Tanso Seni Sangyo (Carbon Fiber Industry) Jul. 23, 1984 by Kenichi Morita et al. pp. 174-183. (translation not readily available).

Primary Examiner—Jeffery Thurlow
Assistant Examiner—Mathieu Vargot
Attorney, Agent, or Firm—W. G. Fasse

[57] ABSTRACT

A carbon/carbon composite material is efficiently and economically produced while maintaining a certain degree of strength, by mechanically mixing a matrix carbon material and carbon fibers in proportions that are determined on the basis of the carbonization ratio of the matrix material and on the basis of the desired ratio of fibers to be contained in a resultant product. After pressure molding the mixture, the mixture is cured, and carbonized while being further pressurized. Thus, additional matrix material is provided which fills open pores left by evaporated matrix material at the time of molding, curing, etc., thereby increasing the density. A carbon/carbon composite material of good quality has been provided without requiring repetition of steps.

4 Claims, 1 Drawing Sheet

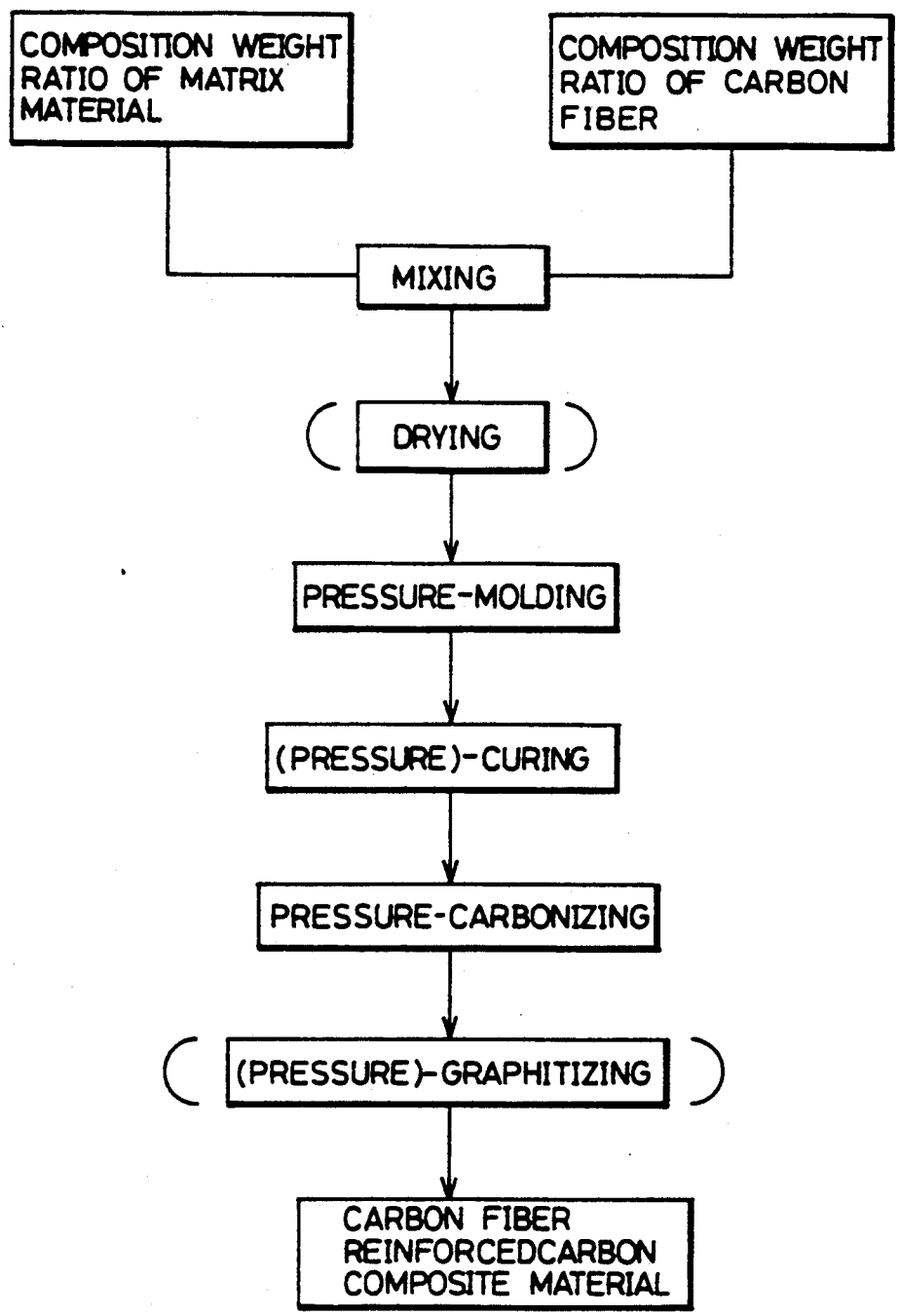

METHOD OF MANUFACTURE COMPOSITE MATERIAL OF CARBON FIBERS IN A CARBON MATRIX

FIELD OF THE INVENTION

The present invention relates generally to a method of manufacturing a composite material of carbon fibers in a carbon matrix, hereinafter simply referred to as carbon/carbon composite material. More specifically, the invention relates to a method of manufacturing a carbon/carbon composite material in which carbon fibers and a carbonizable matrix material are mixed, then molded, cured and carbonized.

BACKGROUND INFORMATION

Impregnation, CVD (Chemical Vapor Deposition), etc. are known as method of manufacturing carbon/carbon composite materials. These methods are disclosed, for example, in TANSO SENI SANGYO (CARBON FIBER INDUSTRY) by KENICHI MORITA, KINDAI HENSHUSHA. According to the impregnation method, a prepreg is formed by impregnating a resin material onto a fiber base material. A multi-layered structure of prepregs is molded and cured thereafter. Then, the cured structure is carbonized at a temperature which is finally raised to a high level, thereby forming a carbon/carbon composite material.

As described above, conventional methods such as impregnation, pressure impregnation carbonization, chemical vapor deposition, etc. are often used for manufacturing carbon/carbon composite materials.

These manufacturing methods, however, all have a problem in that a long period of time is required for the manufacturing. More specifically, in the case of the impregnation method, for example, a part of the resin material that impregnates the fiber base material, evaporates in the steps of curing and carbonization, whereby the evaporated material leaves behind open pores. The formation of such pores degrades the density of the material. Therefore, it is necessary to repeat the steps of curing and carbonization a number of times by impregnating with the resin material a number of times, in order to provide a carbon/carbon composite material with a resultant high density. This repeated impregnation results in a complication of the manufacturing process, because it requires a longer time period for manufacturing. The prolonged time period for manufacturing increases the price of end products.

A number of manufacturing methods have been proposed, in which a carbon/carbon composite material can be manufactured in a shorter period of time. These approaches are disclosed, for example, in Japanese Patent Publication No. 63-5349 and Japanese Patent Application No. 61-197467. According to these methods, long fibers are supplied into a matrix material formed by kneading carbon powder and a resin material. An electron deposition body is formed of the long fiber and substances sticking thereto by applying a voltage to the matrix material. After the electron deposition body is cut into sections of prescribed length and molded into bodies of required shaped, the temperature of the molded bodies is raised to a high level, thereby providing a carbon/carbon composite material. According to the just described method, a high performance carbon/carbon composite material can be produced in a short period of time and at lower costs.

However, some fields of technology do not require such a high performance carbon/carbon composite material. A carbon/carbon composite material above mentioned by the proposed method is being therefore perceived as too expensive for use in such fields of the industry where high performance materials are not essential.

It is difficult to manufacture a carbon/carbon composite material having a certain degree of strength (performance) in an economically efficient manner by using the conventional methods of manufacturing a carbon/carbon composite material.

SUMMARY OF THE INVENTION

It is therefore an object of the present invention to improve the economical efficiency and reduce the manufacturing costs while maintaining a certain degree of strength of the finished product, in a method of manufacturing a carbon/carbon composite material.

Another object of the present invention is to reduce the time required for manufacturing a carbon/carbon composite material.

According to the invention a method of manufacturing a carbon/carbon composite material, the composition ratio of a matrix material and carbon fiber is first decided or determined on the basis of the carbonizing ratio of the matrix material and the desired ratio of the fiber to be contained in an end product, and then these materials are mechanically mixed with due regard to the carbonizing ratio. After molding the mixture by pressurizing, the mixture is cured, and carbonized while being subject to further pressurization.

In operation, a matrix material and carbon fiber (long, medium or short length) are mechanically mixed, the composition ratio of which has been determined on the basis of the carbonization ratio of the matrix material and the desired ratio of the fiber to be included in an end product, and after being molded under pressure, the mixture is cured and carbonized while being further pressurized. The open pores left behind by the evaporated matrix material in the process of molding, curing and carbonization are therefore filled with further matrix material, thereby increasing the density. A carbon/carbon composite material of good quality can therefore be provided without requiring any repetition of manufacturing steps.

The foregoing and other objects, features, aspects and advantages of the present invention will become more apparent from the following detailed description of the present invention when taken in conjunction with the accompanying drawings.

BRIEF DESCRIPTION OF THE DRAWING

The single FIGURE shows a flow chart illustrating a manufacturing process in accordance with the present invention.

DESCRIPTION OF THE PREFERRED EMBODIMENTS

The following were made for comparing EMBODIMENT 1, EMBODIMENT 2 and EMBODIMENT 3, with COMPARISON EXAMPLE 1 and COMPARISON EXAMPLE 2 to confirm the effects provided by the present invention.

EMBODIMENT 1

(1) Powdered phenol resin and carbon fiber fibers 13 mm in length were mixed, using a V-type mixer. The weight ratio was 3:1 at the time of mixing.

(2) The mixture was heat-molded at a temperature of 150° C. The maximum surface pressure at the time of molding was 50 kg/cm$^2$.

(3) The mixture was cured at a temperature of 300° C. while being clamped so that its thickness was not increased by the curing.

(4) A carbon/carbon composite material was obtained by raising the temperature to as high as 2000° C. in a hot press. The maximum surface pressure at the time of the hot pressing was 100 kg/cm$^2$.

EMBODIMENT 2

(1) Furan resin, natural graphite powder, and carbon fibers 50 to 1000 mm in length were mixed using a V-type mixer. The weight ratio was 3:1:1.

(2) The mixture was heat-molded at a temperature of 130° C. The maximum surface pressure at the time of molding was 80 kg/cm$^2$.

(3) The heat-molded mixture was cured at a temperature of 200° C. while being clamped so that its thickness was not increased by the curing.

(4) A carbon/carbon composite material was obtained by raising the temperature to as high as 3000° C. in a hot press furnace. The maximum surface pressure at the time of hot pressing was 80 kg/cm$^2$.

EMBODIMENT 3

(1) Phenol resin, self sintering carbon powder, carbon fibers 50 to 100 mm in length were mixed using a V-type mixer. The weight ratio was 2:1:1.

(2) The mixture was heat-molded at a temperature of 130° C. The maximum surface pressure at the time of molding was 80 kg/cm$^2$.

(3) The heat-molded mixture was cured at a temperature of 200° C. while being clamped so that the thickness of the plate was not increased by the curing.

(4) A carbon/carbon composite material was obtained by raising the temperature to as high as 2500° C. in a hot press. The maximum surface pressure at the time of hot pressing was 80 kg/cm$^2$.

COMPARISON EXAMPLE 1

COMPARISON EXAMPLE 1 corresponds to a conventional impregnation method.

(1) A prepreg of phenol resin and non-woven fabric of carbon fibers is first produced. The weight ratio in the prepreg was 45:55.

(2) The prepreg was formed into a layered structure at a temperature of 150° C. The surface pressure at the time of layering was 20 kg/cm$^2$.

(3) The layered structure was cured at a temperature of 300° C.

(4) The cured form was carbonized at a temperature of 1000° C.

(5) Thus so produced form was once again impregnated with phenol resin, and the steps of curing, carbonization and reimpregnation were repeated three times.

(6) A carbon/carbon composite material was obtained by raising the temperature to as high as 2500° C.

COMPARISON EXAMPLE 2

COMPARISON EXAMPLE 2 corresponds to a technique conventionally proposed as disclosed in Japanese Patent Laying Open No. 63-5349 and Japanese Parent Application No. 61-197467.

(1) Self-sintering carbon powder was disposed into a medium well kneaded with denatured polyacylamide resin. The weight ratio at the time of kneading was 1:1.

(2) An electron deposited body was obtained by continuously supplying carbon fibers into the above-described medium and by applying a voltage of 100 V between the opposing electrodes. The ratio of the carbon fiber and substances sticking thereto in the mixture was 2:3.

(3) The mixture was cut into sections having a length of 13 mm and the sections were heat-molded at a temperature of 130° C. The maximum surface pressure at the time of molding was 80 kg/cm$^2$.

(4) A carbon/carbon composite material was obtained by raising the temperature to as high as 2500° C. in a hot press. The maximum surface pressure was 120 kg/cm$^2$.

The characteristics of the carbon/carbon composite materials obtained by the above described EMBODIMENT 1, EMBODIMENT 2, EMBODIMENT 3, COMPARISON EXAMPLE 1, and COMPARISON EXAMPLE 2 are set forth in the following Table 1.

TABLE 1

| | EMBODIMENT 1 | EMBODIMENT 2 | EMBODIMENT 3 | COMPARISON EXAMPLE 1 | COMPARISON EXAMPLE 2 |
|---|---|---|---|---|---|
| STRENGTH | ○ | ○ | ○ | ○ | ● |
| ECONOMICAL EFFICIENCY | ● | ● | ● | ▲ | ○ |

● ... VERY GOOD
○ ... GOOD
▲ ... POOR

As can be seen from Table 1, the EMBODIMENT 1, EMBODIMENT 2 AND EMBODIMENT 3 of the present invention are economically advantageous as compared to COMPARISON EXAMPLE 1 AND COMPARISON EXAMPLE 2. Table e1 also shows that the embodiments of the invention are not as good in strength as COMPARISON EXAMPLE 2, but the present embodiments still maintains a certain degree of strength. As described above, the EMBODIMENTS 1 and 2 provide a manufacturing method for carbon/carbon composite material, by which the economical efficiency is further improved while maintaining a certain degree of strength.

Now, referring to FIG. 1, a manufacturing process in accordance with the present invention will be described with reference to the shown flow diagram. A matrix material and carbon fiber are mechanically mixed after first deciding the composite weight ratio of the matrix material and the carbon fiber based on the carbonization ratio of the matrix material and the desired ratio of fibers to be included in the end product. In the case of wet mixing the fibers and the matrix material, the resulting wet mixture is first dried. Then, the dried mixture is filled into a metal mold and pressure-molded. Then the molded product is cured. It is preferable to prevent the expansion of the molded product by clamping the product at the time of curing. In the case of a molded product that is unlikely to expand, no such clamping will be necessary. The cured molded product is carbonized using HIP or a hot pres. Thereafter, the cured and carbonized product is graphitized in a high temperature sintering furnace if necessary. Alternatively, the cured form is graphitized, using HIP or a pressure sintering furnace. The above-described steps are conducted without repetition.

According to the step of mixing of the present embodiment, the method of mixing preferably takes advantage of free fall, which does not damage the carbon fibers. In the process of molding, curing, carbonization and/or graphitization, pressure in accordance with the movement of matrix material will be necessary. In other words, an excessive pressure damages the carbon fiber or matrix thereby degrading the strength of the resultant product. Therefore, the proper pressure conditions should be provided for each step taking into account these problems.

As described above, according to the present invention, a matrix material and carbon fiber are mechanically mixed by deciding the composition ratio on the basis of the carbonization ratio of the matrix material and the desired ratio of fibers to be contained in an end product. After having been pressure-molded, the mixture is cured, further pressurized and carbonized. Thus, matrix material positioned around a pore fills the open pores left behind by the evaporated matrix material in the process of molding, curing and carbonization, thereby increasing the density of the finished product. A carbon/fiber/carbon composite material of good quality can therefore be obtained without repeating the steps a number of times. Consequently, the manufacturing time has been reduced, whereby the efficiency of making the product has been further improved while maintaining a certain degree of strength resulting in a more economic product compared to the prior art. Incidentally, the term "carbon powder" as used herein is intended to encompass carbon black, glassy carbon powder, self-sintering carbon powder, graphite powder. The term "whisker" is intended to cover fibers of intermediate length between the short fibers of Embodiment 1 and long fibers of Embodiments 2 and 3.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method for manufacturing a carbon/carbon composite material having carbon fibers embedded in a carbon matrix, comprising the following steps:
   (a) determining a carbonization ratio of a carbon material forming said carbon matrix to provide a carbonization loss factor,
   (b) determining a composition ratio of said carbon matrix and said carbon fibers,
   (c) forming a mixture by mechanically mixing a quantity of said carbon material as a binder sufficient to account for said loss factor and a quantity of said carbon fibers to assure said composition ratio in said composite material, whereby excess matrix material fills pores in said matrix material upon subsequent curing and carbonization,
   (d) pressure molding said mixture to produce a molded form,
   (e) subsequently curing said molded form, and
   f) subsequently carbonizing said molded form under pressure, whereby repetition of production steps is avoided.

2. The method of claim 1, wherein said carbon fibers are selected from the group consisting of short carbon fibers, medium length carbon fibers, and long carbon fibers.

3. The method of claim 1, wherein said carbon material forming said matrix is selected from the group consisting of resin, pitch, and carbon powder.

4. The method of claim 1, wherein said mixture comprises 10 to 70% wt. of carbon fibers, the remainder being said carbon material binder selected from the group consisting of resin 0 to 80% wt., pitch 0 to 80% wt., self-sintering carbon powder 0 to 70% wt., and carbon powder 0 to 50% wt.

* * * * *

UNITED STATES PATENT AND TRADEMARK OFFICE
CERTIFICATE OF CORRECTION

PATENT NO. : 5,236,639
DATED : August 17, 1993
INVENTOR(S) : Seigou Sakagami, Yohsuke Takemura, Satoshi Wakamatsu, Takatoshi Takemoto It is certified that error appears in the above-identified patent and that said Letters Patent is hereby corrected as shown below:

On the title page: Item [54] and Column 1, line 1 the title should read as follows:

--METHOD OF MANUFACTURING COMPOSITE MATERIAL OF CARBON FIBERS IN A CARBON MATRIX--.

In [75] the second inventor's name should be: --Yohsuke Takemura;
the third inventor's name should be:
--Satoshi Wakamatsu--.

In Claim 1, (column 6, line 29), "f)" should be --(f)--.

Signed and Sealed this

Twenty-second Day of March, 1994

Attest:

BRUCE LEHMAN

Attesting Officer    Commissioner of Patents and Trademarks